US012542188B2

(12) United States Patent
Raimondo et al.

(10) Patent No.: US 12,542,188 B2
(45) Date of Patent: Feb. 3, 2026

(54) BOOST-BY-DECK DURING A PROGRAM OPERATION ON A MEMORY DEVICE

(71) Applicant: Micron Technology, Inc., Boise, ID (US)

(72) Inventors: Leo Raimondo, Avezzano (IT); Violante Moschiano, Avezzano (IT); Shyam Sunder Raghunathan, Singapore (SG); Akira Goda, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 24 days.

(21) Appl. No.: 18/604,411

(22) Filed: Mar. 13, 2024

(65) Prior Publication Data

US 2024/0339163 A1    Oct. 10, 2024

Related U.S. Application Data

(60) Provisional application No. 63/457,733, filed on Apr. 6, 2023.

(51) Int. Cl.
*G11C 16/34* (2006.01)
*G11C 16/04* (2006.01)
*G11C 16/10* (2006.01)

(52) U.S. Cl.
CPC ...... *G11C 16/3427* (2013.01); *G11C 16/0483* (2013.01); *G11C 16/10* (2013.01)

(58) Field of Classification Search
CPC ................................. G11C 16/3427
See application file for complete search history.

(56) References Cited

U.S. PATENT DOCUMENTS 9,286,987 B1 *   3/2016   Dong ................. G11C 16/3427

* cited by examiner

*Primary Examiner* — Jason Lappas
(74) *Attorney, Agent, or Firm* — Lowenstein Sandler LLP

(57) ABSTRACT

Control logic in a memory device initiates a program operation on a memory array comprising a top deck and bottom deck. During a seeding phase of the program operation, the control logic causes a first positive voltage to be applied to a first plurality of wordlines of the memory array, wherein the first plurality of wordlines is associated with memory cells in the bottom deck of the memory array that are in a programmed state, and causes a ground voltage to be applied to a second plurality of wordlines of the memory array, wherein the second plurality of wordlines is associated with memory cells in the top deck of the memory array. At an end of the seeding phase of the program operation, the control logic electrically separates the top deck from the bottom deck and causes a program voltage to be applied to a selected wordline of the memory array during an inhibit phase of the program operation, wherein the selected wordline is associated with respective memory cells in the top deck of the memory array.

20 Claims, 8 Drawing Sheets

BOOST-BY-DECK DURING A PROGRAM OPERATION ON A MEMORY DEVICE

RELATED APPLICATIONS

This application claims the benefit of U.S. Patent Application No. 63/457,733 filed Apr. 6, 2023, the entire contents of which are hereby incorporated by reference herein.

TECHNICAL FIELD

Embodiments of the disclosure relate generally to memory sub-systems, and more specifically, relate to boost-by-deck during a program operation on a memory device in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
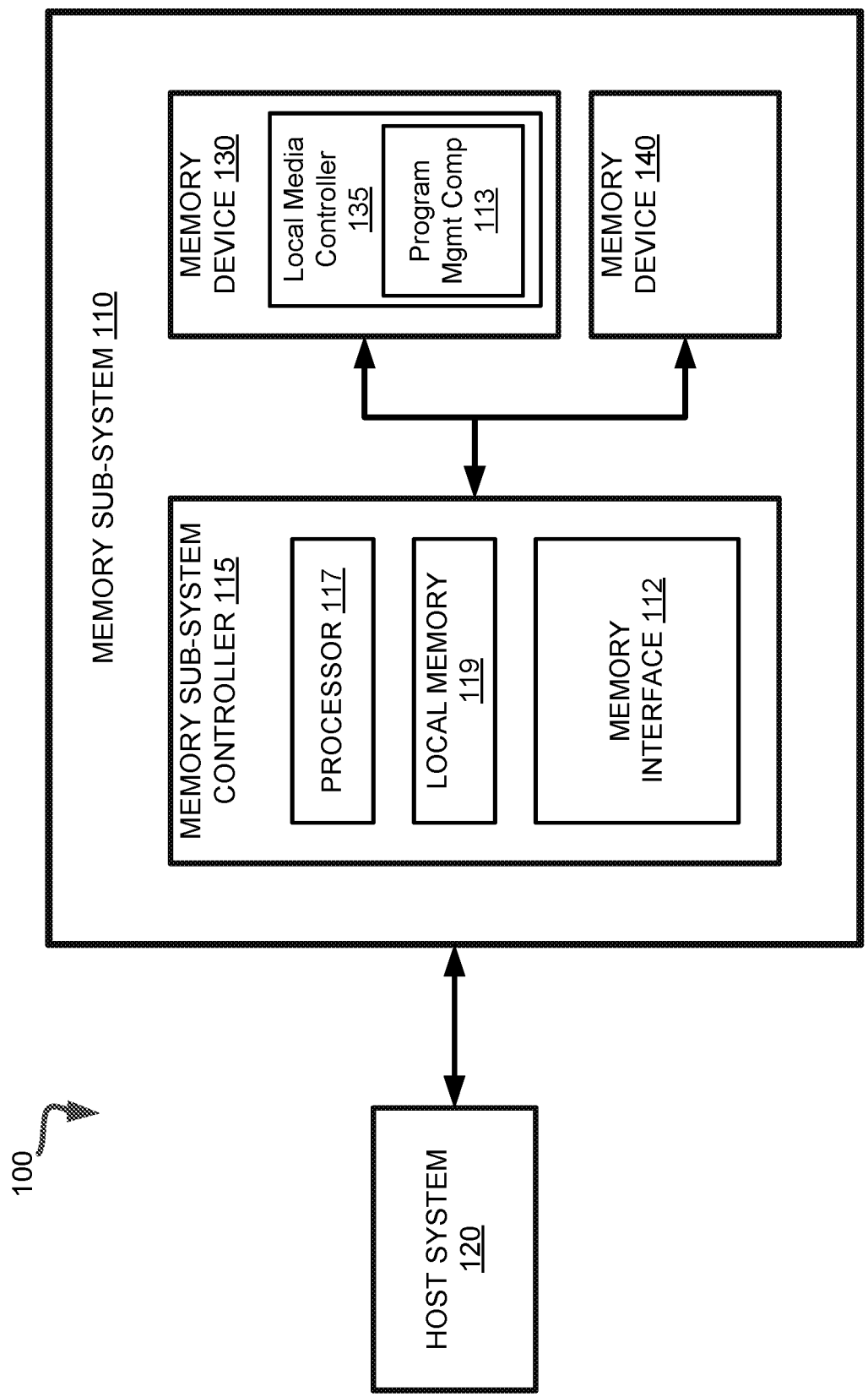
FIG. 1A illustrates an example computing system that includes a memory sub-system in accordance with some embodiments of the present disclosure.

Aspects of the present disclosure are directed to boost-by-deck during a program operation on a memory device in a memory sub-system implementing a block-by-deck feature. As described in more detail below, the block-by-deck feature enables individual decks of a multi-deck memory device to be programmed, read, or erased independently. The boost-by-deck functionality allows such an operation to be performed on one deck (e.g., the deck closest to the source of the memory device) while preserving reliability of data stored in memory cells on one or more other decks of the memory device. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more die, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A data block hereinafter refers to a unit of the memory device used to store data and can include a group of memory cells, a wordline group, a wordline, or individual memory cells. Each data block can include a number of sub-blocks, where each sub-block is defined by a set of associated pillars (e.g., one or more vertical conductive traces) extending from a shared bit line. Memory pages (also referred to herein as "pages") store one or more bits of binary data corresponding to data received from the host system. To achieve high density, a string of memory cells in a non-volatile memory device can be constructed to include a number of memory cells at least partially surrounding a pillar of channel material. The memory cells can be coupled to access lines, which are commonly referred to as "wordlines," often fabricated in common with the memory cells, so as to form an array of strings in a block of memory. The compact nature of certain non-volatile memory devices, such as 3D flash NAND memory, means wordlines are common to many memory cells within a block of memory.

A desire for increased storage capacity in memory devices drives an expansion of block sizes, including an increase of the number of wordlines in each block. The presence of such additional wordlines, however, presents certain challenges including, for example, performance and reliability penalties attributable to various inefficiencies (e.g., associated with garbage collection or other media management operations for the increased block size). Certain memory devices are thus divided into multiple segments, sometimes referred to as "decks." For example, a memory device could include a top (or "upper") deck and a bottom (or "lower") deck, each including a respective set of wordlines from the block. Other memory device can include more than two decks. In some instances, the separate decks are individually accessible, such that a memory access operation (i.e., a program, read, or erase operation) could be performed on one deck without impacting memory cells of the other deck. The functionality can be referred to as the "block-by-deck" feature.

When such a memory access operation is performed on one deck of a the memory device using the block-by-deck feature, there is a need to preserve the state of the memory cells in the other deck(s). During a programming operation on one deck, for example, a selected memory cell(s) can be programmed with the application of a programming voltage to a selected wordline. Due to the wordline being common to multiple memory cells, unselected memory cells can be subject to the same programming voltage as the selected memory cell(s). If not otherwise preconditioned, the unselected memory cells can experience effects from the programming voltage on the common wordline. These programming voltage effects can include the condition of charge being stored in the unselected memory cells which are expected to maintain stored data. This programming voltage effect is termed a "programming disturbance" or "program disturb" effect. The program disturb effect can render the charge stored in the unselected memory cells unreadable altogether or, although still apparently readable, the contents of the memory cell can be read as a data value different than the intended data value stored before application of the programming voltage. This is particularly relevant when the bottom deck (i.e., the deck closest to the source in the memory device) was previously programmed and thus the memory cells there are already in a programmed state, rather than in an erased state. When a programming operation is performed on the top deck while the bottom deck is already in this programmed state, the program disturb effects in the top deck are exacerbated.

Certain programming algorithms operate to program the memory cells in a memory string from a drain end of the memory string to a source end of the memory string (e.g., from top to bottom). Thus, as the programming algorithm progresses, the memory cells associated with wordlines above the selected wordline (i.e., the wordline currently being programmed) have already been programmed, while the memory cells associated with wordlines below the selected wordline have not yet been programmed (e.g., are in an erased state). Thus, these programming algorithms are designed to decrease or even eliminate the program disturb effects on the memory cells associated with wordlines above the selected wordline, while being less concerned with any impact on the memory cells associated with wordlines below the selected wordline. When such programming algorithms are used on a memory device having multiple decks, however, additional challenges are introduced since the memory strings span the multiple decks. For example, in a situation where memory cells in the bottom deck have been previously programmed, and a new program operation is to be performed on the memory cells in the top deck, the situation exists where the memory cells associated with wordlines below the selected wordline are in a programmed state. As noted above, the programming algorithms do not account for such a situation and program disturb effects can be introduced in the bottom deck, potentially hurting reliability of the data stored there.

Aspects of the present disclosure address the above and other deficiencies by implementing a boost-by-deck technique during program operations on a multi-deck memory device. In one embodiment, in order to preserve the reliability of data that has previously been programmed to memory cells associated with wordlines in the bottom deck of the memory device and to reduce the occurrence of program disturb effects on memory cells associated with wordlines in the top deck of the memory device, control logic of the memory device can use the boost-by-deck techniques described herein. In one embodiment, this includes causing a higher voltage to be applied to wordlines of the bottom deck during a seeding phase of the program operation in order to allow a seeding voltage to pass through the programmed memory cells from the source end of the memory strings more effectively and then electrically disconnecting the bottom deck from the top deck (e.g., through creation of an electric field) during an inhibit phase of the program operation to prevent the lower boost voltages used in the bottom deck from mixing with the higher boost voltages used in the top deck.

Advantages of this approach include, but are not limited to, improved performance in the memory device. In the manner described herein, a drain-to-source programming algorithm can be used effectively in a multi-deck memory device to allow memory cells associated with wordlines in the top deck to be programmed without impacting previously programmed memory cells associated with wordlines in the bottom deck of the memory device. The higher voltages applied to the wordlines in the unselected deck (e.g., the bottom deck) allow the seeding voltage to pass through effectively, thereby raising the channel potential on the top deck, which reduces the impact of program disturb effects on the top deck. Additionally, electrical disconnection of the top and bottom decks enables use of a lower boost voltage on the wordlines of the bottom deck during the inhibit phase. The use of the lower boost voltage reduces the occurrence of program disturb effects on the bottom deck and improves reliability of the memory device. Thus, the boost-by-deck technique both improves program disturb on the top deck when bottom deck is in programmed state instead of erased state, as well as improves program disturb on the bottom deck itself. These improvements are realized in memory devices including more than two decks as well.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not- and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not- or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, the memory sub-system 110 includes a memory interface component 112. Memory interface component 112 is responsible for handling interactions of memory sub-system controller 115 with the memory devices of memory sub-system 110, such as memory device 130. For example, memory interface component 112 can send memory access commands corresponding to requests received from host system 120 to memory device 130, such as program commands, read commands, or other commands. In addition, memory interface component 112 can receive data from memory device 130, such as data retrieved in response to a read command or a confirmation that a program command was successfully performed. In some embodiments, the memory sub-system controller 115 includes at least a portion of the memory interface 112. For example, the memory sub-system controller 115 can include a processor 117 (processing device) configured to execute instructions stored in local memory 119 for performing the operations described herein. In some embodiments, the memory interface component 112 is part of the host system 110, an application, or an operating system.

In one embodiment, memory device 130 includes a memory device program management component 113 that can oversee, control, and/or manage data access operations, such as program operations, performed on a non-volatile memory device, such as memory device 130, of memory sub-system 110. In one embodiment, local media controller 135 includes at least a portion of program management component 113 and is configured to perform the functionality described herein. In such an embodiment, program management component 113 can be implemented using hardware or as firmware, stored on memory device 130, executed by the control logic (e.g., program management component 113) to perform the operations described herein.

A program operation, for example, can include a number of phases, such as a seeding phase, a separation phase, an inhibit/programming phase, followed by a program verify phase. The program operation can include many such phases in repetition. Program management component 113 is responsible for causing certain voltages to be applied (or indicating which voltages to apply) to memory device 130 during the program operation. In one embodiment, program management component 113 can implement the boost-by-deck technique when performing the program operation on memory device 130, which can be a multi-deck memory device, in order to preserve the reliability of data that has previously been programmed to memory cells associated with wordlines in the unselected deck(s) of the memory device and to reduce program disturb effects in the selected deck (i.e., the deck being programmed). For example, program management component 113 can cause a higher voltage to be applied to wordlines of the bottom deck during the seeding phase of the program operation in order to allow a seeding voltage to pass through the programmed memory cells from the source end of the memory strings more effectively and then electrically disconnecting the bottom deck from the top deck (e.g., through creation of an electric field) during a separation phase of the program operation to prevent the lower boost voltages used in the bottom deck from mixing with the higher boost voltages used in the top deck during the inhibit phase. Further details with regards to the operations of the program management component 113 are described below.

Figure 1B:
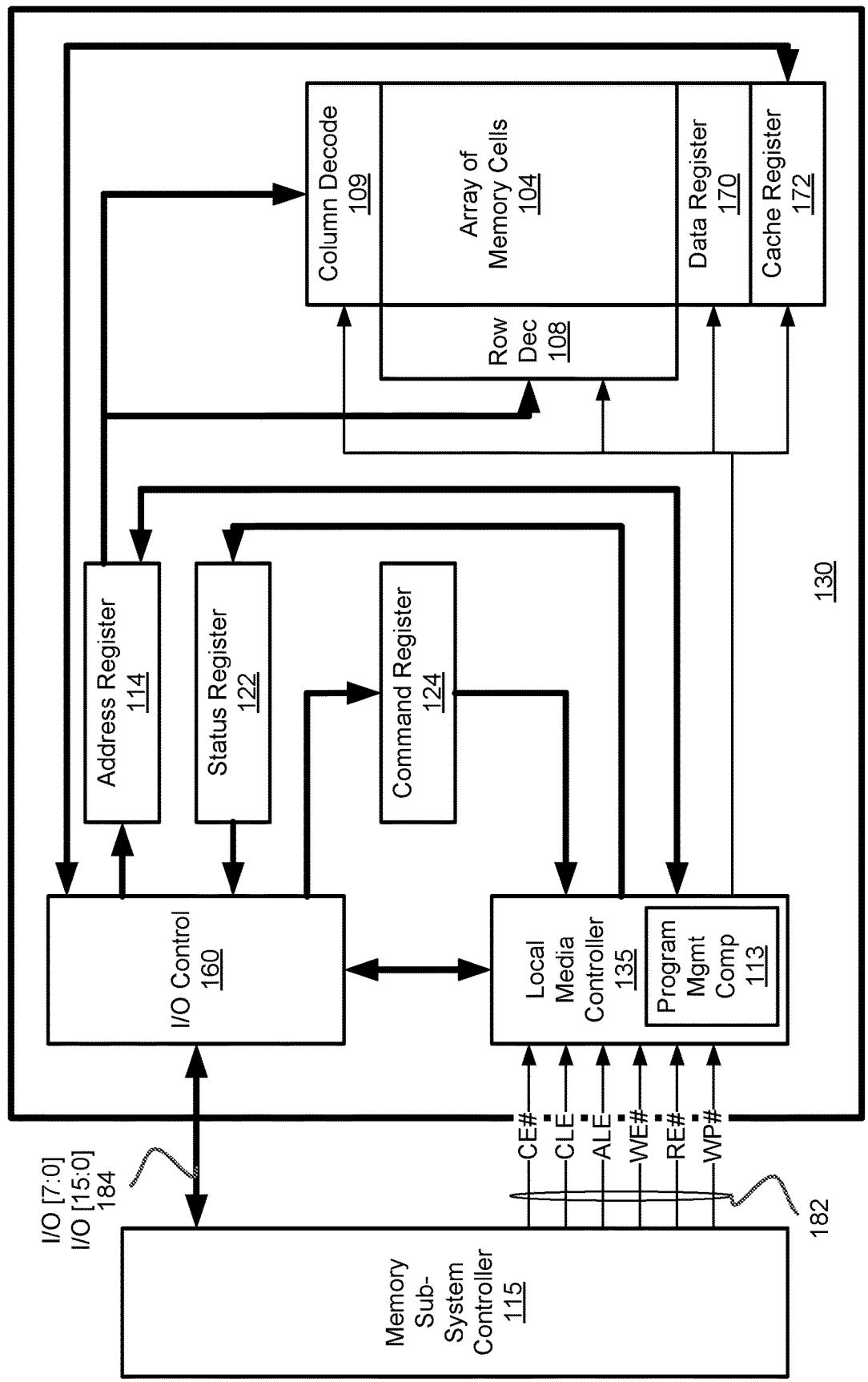
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device. In one embodiment, memory sub-system controller 115 includes suspend manager 114.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 includes program management component 113, which can implement the boost-by-deck technique during program operations on a multi-deck memory device, such as memory device 130.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 182. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 182 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 184 and outputs data to the memory sub-system controller 115 over I/O bus 184.

For example, the commands may be received over input/output (I/O) pins [7:0] of I/O bus 184 at I/O control circuitry 160 and may then be written into command register 124. The addresses may be received over input/output (I/O) pins [7:0] of I/O bus 184 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2A:
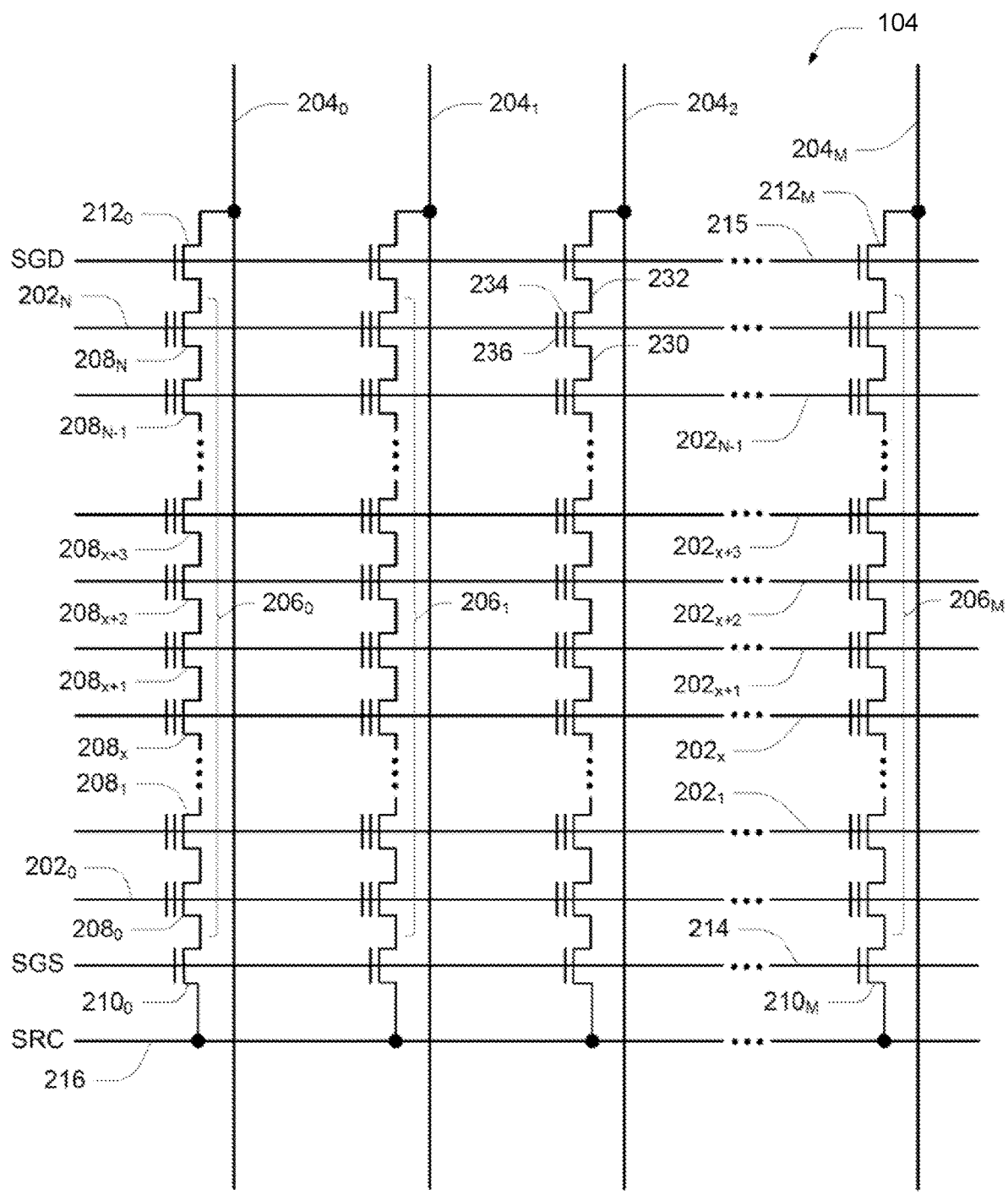
FIG. 2A is a schematic of portions of an array of memory cells as could be used in a memory of the type described with reference to FIG. 1B in accordance with some embodiments of the present disclosure.

FIG. 2A is a schematic of portions of an array of memory cells 104, such as a NAND memory array, as could be used in a memory of the type described with reference to FIG. 1B according to an embodiment. Memory array 104 includes access lines, such as wordlines $202_0$ to $202_N$, and data lines, such as bit lines $204_0$ to $204_M$. The wordlines 202 can be connected to global access lines (e.g., global wordlines), not shown in FIG. 2A, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $212_0$ can be connected to the bit line $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bit line 204. A control gate of each select gate 212 can be connected to select line 215.

The memory array 104 in FIG. 2A can be a quasi-two-dimensional memory array and can have a generally planar structure, e.g., where the common source 216, NAND strings 206 and bit lines 204 extend in substantially parallel planes. Alternatively, the memory array 104 in FIG. 2A can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bit lines 204 (e.g., bit lines $204_0$, $204_2$, $204_4$, etc.) can be one physical page of the memory cells 208 (e.g., even memory cells) while memory cells 208 commonly connected to wordline $202_N$ and selectively connected to odd bit lines 204 (e.g., bit lines $204_1$, $204_3$, $204_5$, etc.) can be another physical page of the memory cells 208 (e.g., odd memory cells).

Although bit lines $204_3$-$204_5$ are not explicitly depicted in FIG. 2A, it is apparent from the figure that the bit lines 204 of the array of memory cells 104 can be numbered consecutively from bit line $204_0$ to bit line $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 2B:
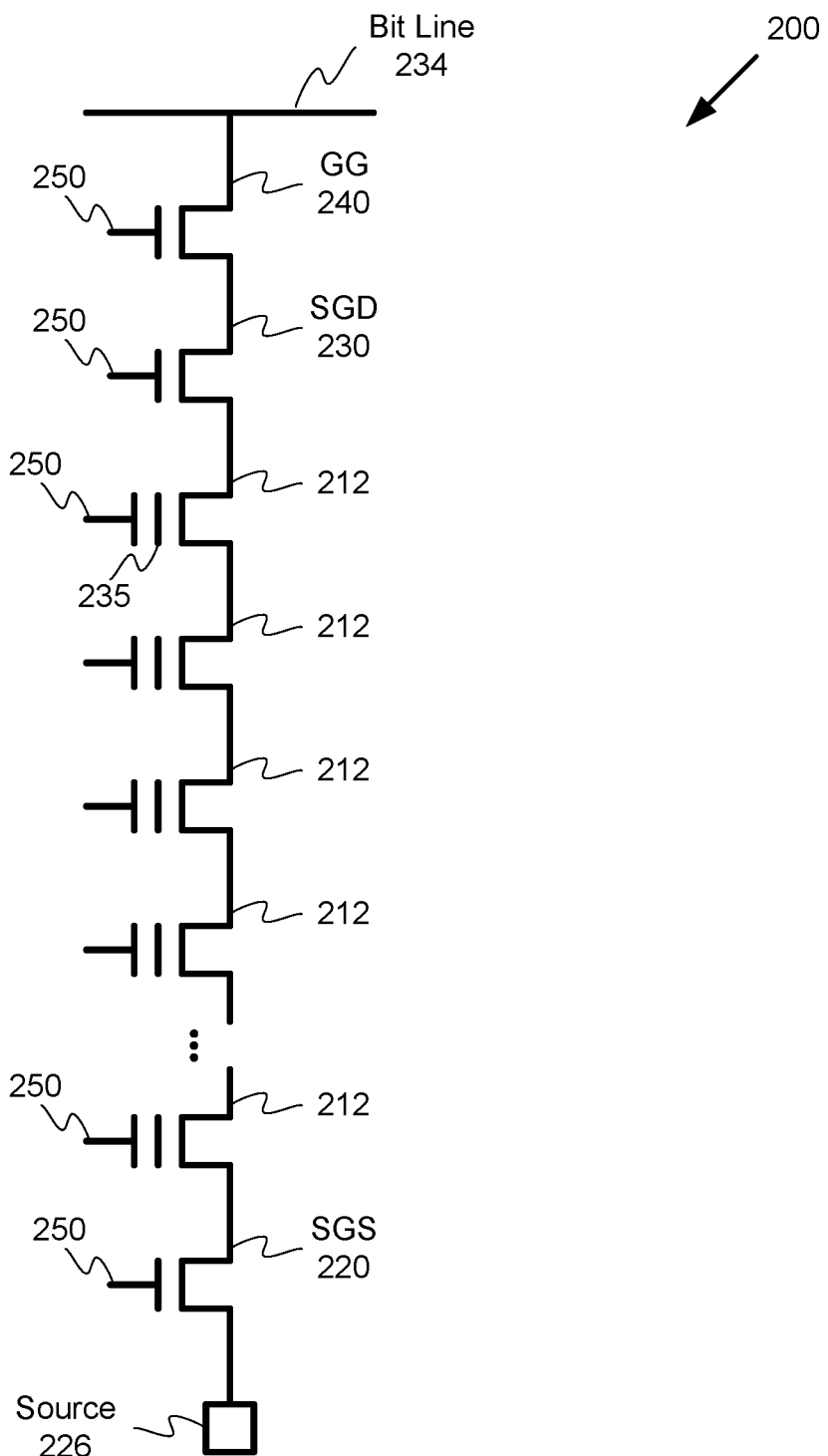
FIG. 2B is a schematic diagram illustrating a string of memory cells in a data block of a memory device in a memory sub-system in accordance with some embodiments of the present disclosure.

FIG. 2B is a schematic diagram illustrating a string 200 of memory cells in a data block of a memory device in a memory sub-system in accordance with some embodiments of the present disclosure. In one embodiment, the string 200 is representative of one portion of memory device 130, such as from array of memory cells 104, as shown in FIG. 2A. The string 200 includes a number of memory cells 212 (i.e., charge storage devices), such as up to 32 memory cells (or more) in some embodiments. The string 200 includes a source-side select transistor known as a source select gate 220 (SGS) (typically an n-channel transistor) coupled between a memory cell 212 at one end of the string 200 and a common source 226. The common source 226 may include, for example, a commonly doped semiconductor material and/or other conductive material. At the other end of the string 200, a drain-side select transistor called a drain select gate 230 (SGD) (typically an n-channel transistor) and a gate induced drain leakage (GIDL) generator 240 (GG) (typically an n-channel transistor) are coupled between one of the memory cells 212 and a data line 234, which is commonly referred to in the art as a "bit line." The common source 226 can be coupled to a reference voltage (e.g., ground voltage or simply "ground" [Gnd]) or a voltage source (e.g., a charge pump circuit or power supply which may be selectively configured to a particular voltage suitable for optimizing a programming operation, for example).

Each memory cell 212 may include, for example, a floating gate transistor or a charge trap transistor and may comprise a single level memory cell or a multilevel memory cell. The floating gate may be referred to as a charge storage structure 235. The memory cells 212, the source select gate 220, the drain select gate 230, and the GIDL generator 240 can be controlled by signals on their respective control gates 250.

The control signals can be applied by program management component 113, or at the direction of program management component 113, to select lines (not shown) to select strings, or to access lines (not shown) to select memory cells 212, for example. In some cases, the control gates can form a portion of the select lines (for select devices) or access lines (for cells). The drain select gate 230 receives a voltage that can cause the drain select gate 230 to select or deselect the string 200. In one embodiment, each respective control gate 250 is connected to a separate wordline (i.e., access line), such that each device or memory cell can be separately controlled. The string 200 can be one of multiple strings of memory cells in a block of memory cells in memory device 130. In one embodiment, wherein memory device 130 is a multi-deck memory device, each of the multiple memory strings can span two or more decks (e.g., a top deck and a bottom deck), such that certain memory cells 212 in the string 200 are part of the top deck and certain memory cells 212 are part of the bottom deck. For example, when multiple strings of memory cells are present, each memory cell 212 in string 200 may be connected to a corresponding shared wordline, to which a corresponding memory cell in each of the multiple strings is also connected. As such, if a selected memory cell in one of those multiple strings is being programmed, a corresponding unselected memory cell 212 in another string which is connected to the same wordline as the selected cell can be subjected to the same programming voltage, potentially leading to program disturb effects. In addition, other unselected memory cells 212 in the string 200, including memory cells in the selected deck (e.g., the top deck) of memory device 130, can suffer program disturb effects by virtue of the drain-to-source programming algorithm when the memory cells in the unselected deck (e.g., the bottom deck) are in the programmed state rather than the erased state.

Accordingly, in one embodiment, program management component 113 causes a wordline driver to apply a seeding voltage to the source 226 during a seeding phase of the program operation, and causes a positive voltage to be applied to the wordlines connected to the control gates 250 of the devices and/or cells 212 in the string 200 which are part of the bottom deck during the seeding phase. The positive voltage applied to these wordlines can be a higher voltage than a voltage (e.g., 0V) applied to the wordlines connected to the control gates 250 of the devices and/or cells 212 in the string 200 which are part of the top deck. In addition, program management component 113 can electrically disconnect the bottom deck from the top deck (e.g., through creation of an electric field) during a separation phase of the program operation to prevent the lower boost voltages used in the bottom deck from mixing with the higher boost voltages used in the top deck during the inhibit/programming phase.

Figure 3:
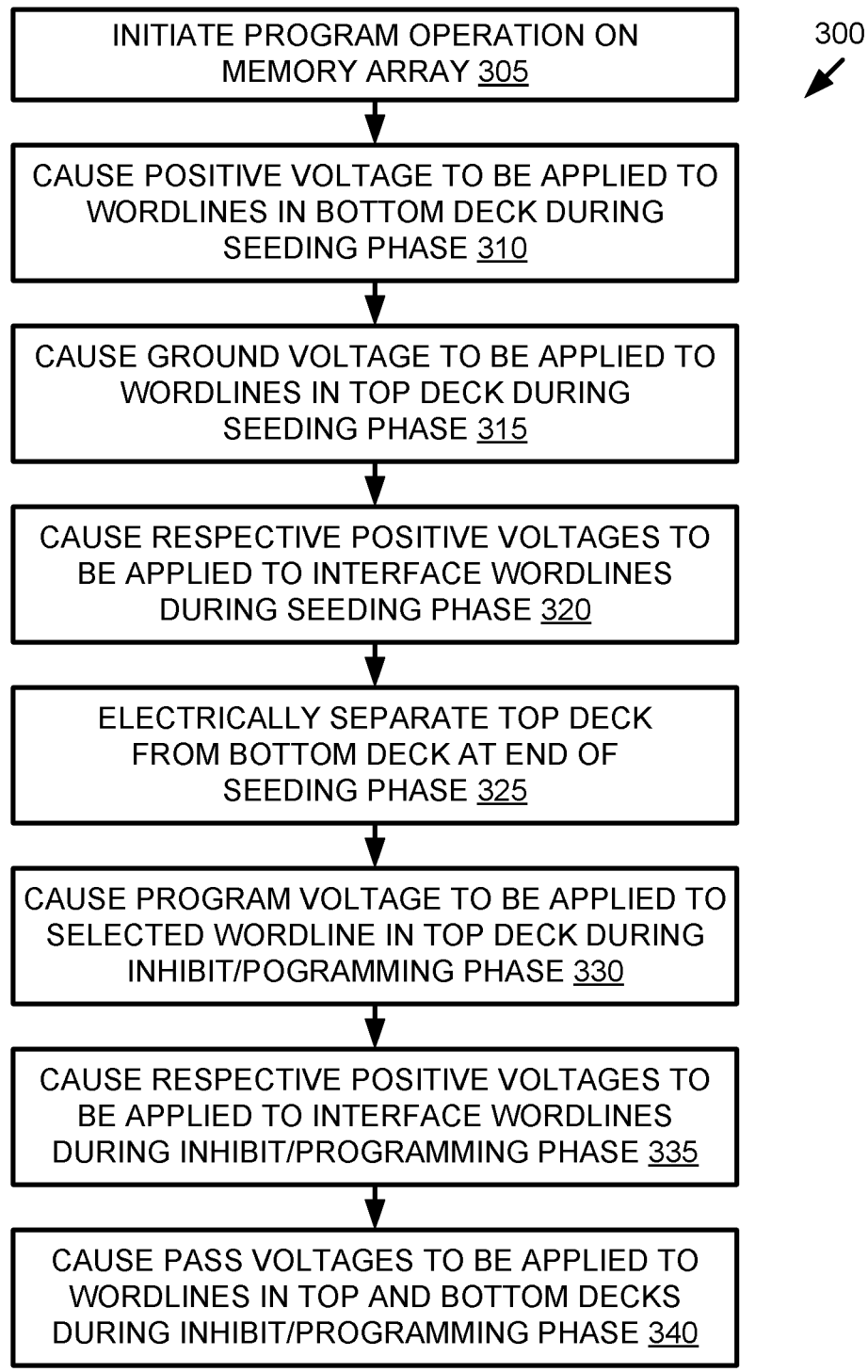
FIG. 3 is a flow diagram of an example method of implementing boost-by-deck during a program operation on a memory device, in accordance with some embodiments of the present disclosure.

FIG. 3 is a flow diagram of an example method of implementing boost-by-deck during a program operation on a memory device, in accordance with some embodiments of the present disclosure. The method 300 can be performed by control logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by program management component 113 of FIG. 1A and FIG. 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figures 4A, 4B:
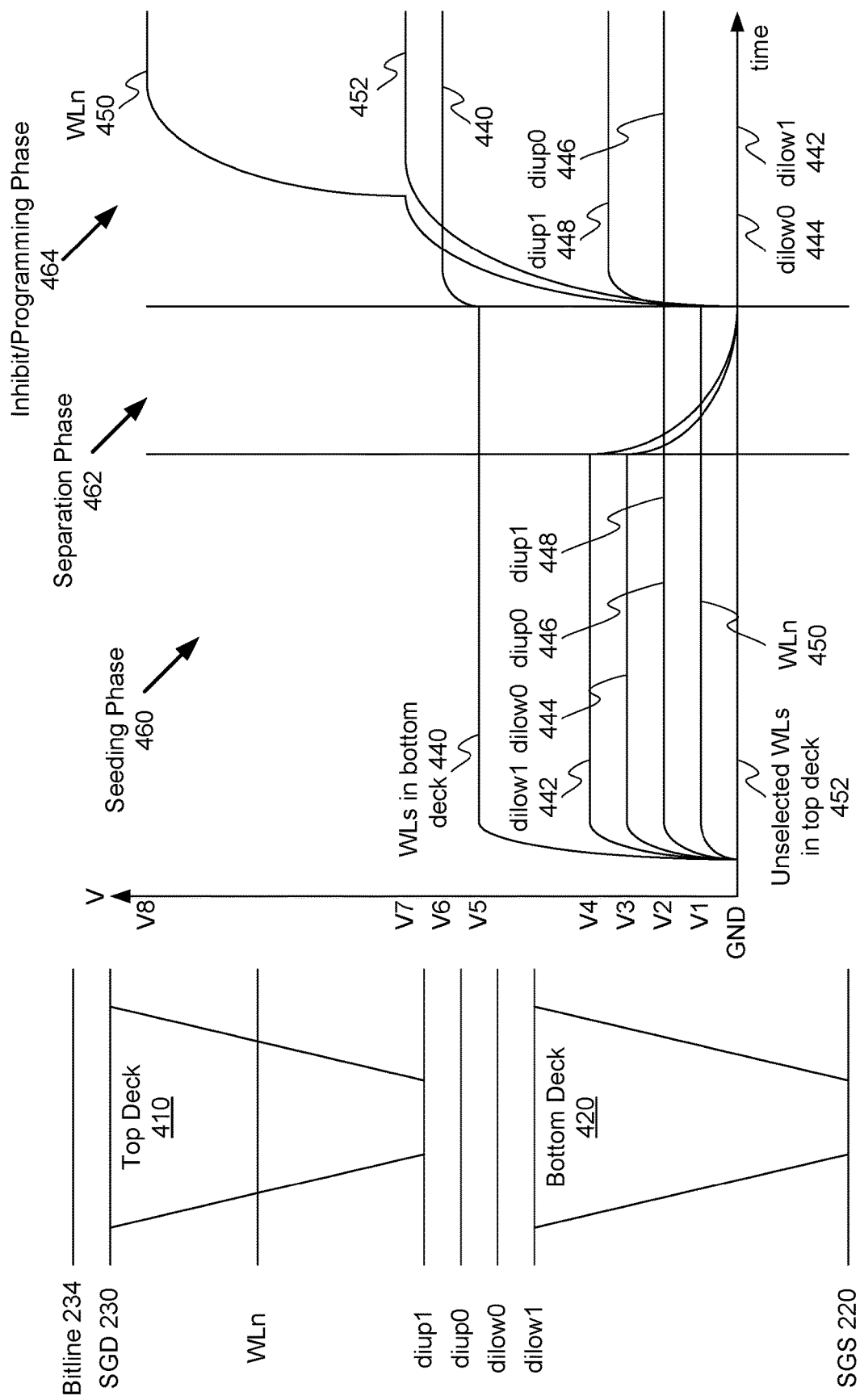
FIG. 4A is a diagram illustrating a memory array of a multi-deck memory device, in accordance with some embodiments of the present disclosure.
FIG. 4B is a timing diagram for operation of a memory device implementing boost-by-deck during a program operation, in accordance with some embodiments of the present disclosure.

At operation 305, a program operation is initiated. For example, the control logic (e.g. local media controller 135 or program management component 113) can initiate a program operation on a memory device (e.g., memory device 130). In one embodiment, the program operation includes a seeding phase, a separation phase, an inhibit/programming phase, and a program verify phase. In certain embodiments, each of these phases can be repeated numerous times in a cycle during a single programming operation. The seeding phase generally includes global charging up of channel potential of inhibited strings in the memory device 130 in an attempt to counter-act program disturb resulting from the use of high voltage program pulses. In one embodiment, the memory device is a multi-deck memory device, including an array of memory cells divided into two or more decks. For example, as shown in FIG. 4A, the memory array can include a top deck 410 and a bottom deck 420. Each deck includes a corresponding set of wordlines that are coupled to memory cells arranged in memory strings, such as string 200. In one embodiment, the top deck 410 is arranged vertically above the bottom deck 420, such that the memory strings can extend from a drain (e.g., bitline 234 accessible via SGD 230) adjacent to the top deck 410 to a source (e.g., bitline 430 accessible via SGS 220) adjacent to the bottom deck 420 of the memory array. In other embodiments there can be some other number or arrangement of decks in the memory device 130. In one embodiment, the program operation is a drain to source (D2S) program operation that proceeds wordline by wordline from the drain to the source within each deck. Accordingly, when the memory cells associated with a selected wordline (e.g., WLn) is being programmed, the memory cells associated with wordlines in the same deck and located above the selected wordline (i.e., closer to the SGD 230) will have already been programmed, while the memory cells associated with wordlines located in the same deck and below the selected wordline (i.e., closer to the SGS 220) will not yet have been programmed.

Figures 5A, 5B:
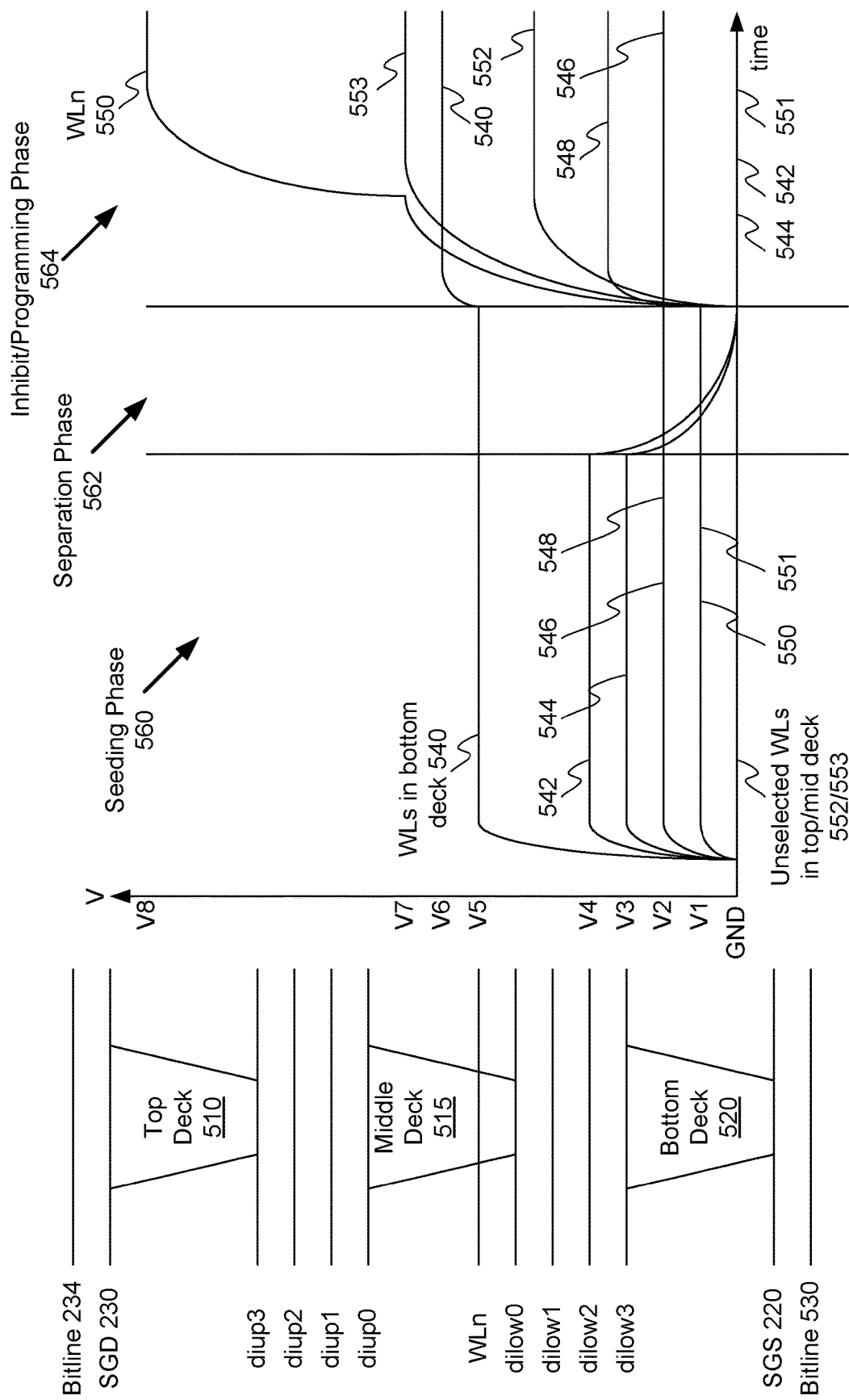
FIG. 5A is a diagram illustrating a memory array of a multi-deck memory device, in accordance with some embodiments of the present disclosure.
FIG. 5B is a timing diagram for operation of a memory device implementing boost-by-deck during a program operation, in accordance with some embodiments of the present disclosure.

Although only two decks (i.e., top deck 410 and bottom deck 420) are illustrated in FIG. 4A, it should be appreciated that certain memory devices can include more than two decks (e.g., three decks, four decks, etc.). For example, as shown in FIG. 5A, the memory array can include a top deck 510, a middle deck 515, and a bottom deck 520. Each deck includes a corresponding set of wordlines that are coupled to memory cells arranged in memory strings, such as string 200. In one embodiment, the top deck 510 is arranged vertically above the middle deck 515, which is arranged vertically above the bottom deck 520, such that the memory strings can extend from a drain (e.g., bitline 234 accessible via SGD 230) adjacent to the top deck 510, through the middle deck 515, to a source (e.g., bitline 530 accessible via SGS 220) adjacent to the bottom deck 520 of the memory array. In other embodiments there can be some other number or arrangement of decks in the memory device 130. In one embodiment, the program operation is a drain to source (D2S) program operation that proceeds wordline by wordline from the drain to the source within each deck. Accordingly, when the memory cells associated with a selected wordline (e.g., WLn) is being programmed, the memory cells associated with wordlines in the same deck and located above the selected wordline (i.e., closer to the SGD 230) will have already been programmed, while the memory cells associated with wordlines located in the same deck and below the selected wordline (i.e., closer to the SGS 220) will not yet have been programmed. Thus, such memory devices with more than two decks may utilize a similar drain to source programming algorithm and thus, face similar challenges as memory devices with two decks. While the principles of boost-by-deck operation are described herein with respect to the two deck example, they are equally applicable to memory devices including more than two decks. In these cases, the deck on which memory cells are currently being programmed can be referred to as the selected deck, and the one or more remaining decks can be referred to as the unselected deck(s). For example, as shown in FIG. 5A, the selected wordline WLn is located within the middle deck 515, and thus the middle deck 515 can be referred to as the selected deck, while the top deck 510 and bottom deck 520 are the unselected decks. Accordingly, the operations described herein with respect to the top deck are equally applicable to the selected deck, while the operation described with respect to the bottom deck are also applicable to the unselected deck(s) in such memory devices.

Referring again to FIG. 3, at operation 310, a positive voltage is applied to certain wordlines. In one embodiment, the control logic can cause a seeding voltage to be applied to a string of memory cells in a data block of the memory device during the seeding phase of the program operation. During the seeding phase, program management component 113 causes a signal having a seeding voltage to be applied to the memory string 200 (e.g., via the source terminal from bitline 430). In one embodiment, the control logic further causes a first positive voltage to be applied to a first plurality of wordlines of the memory array during the seeding phase. That first plurality of wordlines can be associated with memory cells in the bottom deck 420 of the memory array. In one embodiment, those memory cells in the bottom deck 420 can have already been programmed (e.g., as part of a previous program operation) and thus can be referred to as being in a programmed state, such that the data stored thereon is to be preserved. FIG. 4B is a timing diagram for operation of a memory device implementing boost-by-deck during a program operation, in accordance with some embodiments of the present disclosure. The diagram illustrates multiple phases of the program operation including seeding phase 460, separation phase 462, and inhibit/programming phase 464. During the seeding phase 460, the control logic can cause the first positive voltage (i.e., V5) to be applied to the wordlines in the bottom deck 420, as shown by waveform 440. The magnitude of the first positive voltage is configurable and can vary based on the specific implementation. The magnitude is generally higher than that of the voltage signals applied to other wordlines in the memory array, as will be described in more detail below. Since the memory cells in the bottom deck could be already programmed in the block-by-deck case (i.e., violating the drain-to-source programming order), there is at least one of those memory cells characterized by a threshold voltage (Vth) at a higher level (L1 for SLC program or L7 in TLC program or L15 in QLC program etc.). Thus, to let the seed potential pass through the channels of the memory cells of the bottom deck, the wordlines of the bottom deck can have voltage greater than the Vth applied to those cells, which can be as high as L7 in TLC, for example. In a random pattern program, it is not possible to know which memory cell inside bottom deck is placed in L1, so the higher voltage can be applied in seeding to all the wordlines in the bottom deck.

FIG. 5B illustrates similar operation of the memory device having three decks, as shown in FIG. 5A. The diagram illustrates similar phases of the program operation including seeding phase 560, separation phase 562, and inhibit/programming phase 564. During the seeding phase 560, the control logic can cause the first positive voltage (i.e., V5) to be applied to the wordlines in the unselected bottom deck 420, as shown by waveform 540. The magnitude of the first positive voltage is configurable and can vary based on the specific implementation. The magnitude is generally higher than that of the voltage signals applied to other wordlines in the memory array, as will be described in more detail below. Since the memory cells in the bottom deck 520 could be already programmed in the block-by-deck case (i.e., violating the drain-to-source programming order), there is at least one of those memory cells characterized by a threshold voltage (Vth) at a higher level (L1 for SLC program or L7 in TLC program or L15 in QLC program etc.). Thus, to let the seed potential pass through the channels of the memory cells of the bottom deck, the wordlines of the bottom deck can have voltage greater than the Vth applied to those cells, which can be as high as L7 in TLC, for example. In a random pattern program, it is not possible to know which memory cell inside bottom deck is placed in L1, so the higher voltage can be applied in seeding to all the wordlines in the bottom deck.

At operation, 315, a ground voltage is applied to certain wordlines. For example, the control logic can cause a ground voltage (e.g., 0V), or some other low voltage, to be applied to a second plurality of wordlines of the memory array during the seeding phase of the program operation. That second plurality of wordlines can be associated with memory cells in the top deck 410 of the memory array. For example, the second plurality of wordlines can include all of the wordlines in the top deck 410 except for the selected wordline (i.e., WLn—the wordline associated with the memory cells currently being programmed). As shown in FIG. 4B, the ground voltage applied to the unselected wordlines in the top deck 410 during the seeding phase 460 is represented by waveform 452. In addition, a relatively low positive voltage (i.e., V1) can be applied to the selected wordline (i.e., WLn) during the seeding phase 460, as represented by waveform 450). As shown in FIG. 5B, the ground voltages applied to the wordlines in the top deck 510 and the unselected wordlines in the middle deck 515 during the seeding phase 460 are represented by waveform 552 and 553, respectively. In addition, a relatively low positive voltage (i.e., V1) can be applied to the selected wordline (i.e., WLn) during the seeding phase 560, as represented by waveform 550).

At operation 320, respective voltages are applied to interface wordlines. For example, the control logic can cause respective positive voltages to be applied to a plurality of interface wordlines of the memory array during the seeding phase 460 of the program operation. In one embodiment, the plurality of interface wordlines are positioned at a boundary between the top deck 410 and the bottom deck 420 of the memory array, and can include for example, diup1, diup0, dilow0, and dilow1. In one embodiment, the interface wordlines are "dummy" wordlines which are associated with memory cells in the memory array that are not actually used for storing host data. In other embodiments, there can be some other number or arrangement of interface wordlines. As shown in FIG. 4B, the respective positive voltages applied to the interface wordlines during the seeding phase

460 are represented by waveforms 442, 444, 446, and 448. For example, a first voltage (i.e., V4) can be applied to a first interface wordline dilow 1 (i.e., the interface wordline closest to the source end of the memory string) as represented by waveform 442. A second voltage (i.e., V3—having a magnitude lower than V4) can be applied to a second interface wordline dilow0 (i.e., the next interface wordline towards the drain end of the memory string) as represented by waveform 444. A third voltage (i.e., V2—having a magnitude lower than V3) can be applied to a third interface wordline diup0 (i.e., the next interface wordline towards the drain end of the memory string) and to a fourth interface wordline diup1 (i.e., the interface wordline closest to the drain end of the memory string). In other embodiments, the respective voltages can have some other relationship relative to one another. This particular arrangement of the respective positive voltages is configured to generate a graded electric field between the top deck 410 and the bottom deck 420 of the memory array due to the potential difference in the channel of the memory string created by the respective wordline voltages. The presence of a gently graded electric field along the channel can reduce or avoid hot electron generation and the accompanying damaging impacts. In one embodiment, all the interface dummy WL voltages are not positive, and depending on the WL voltages on the other WLs, they may be negative as well.

As shown in FIG. 5B, the respective positive voltages applied to the interface wordlines during the seeding phase 560 are represented by waveforms 542, 544, 546, and 548. For example, a first voltage (i.e., V4) can be applied to interface wordlines dilow2 and dilow3 (i.e., the interface wordlines closest to the source end of the memory string) as represented by waveform 542. A second voltage (i.e., V3—having a magnitude lower than V4) can be applied to interface wordlines dilow 1 and diup1 as represented by waveform 544. A third voltage (i.e., V2—having a magnitude lower than V3) can be applied to a third interface wordlines dilow0 and diup0 (i.e., the interface wordlines above and below the middle deck 515) as represented by waveform 546. A fourth voltage (i.e., V1—having a magnitude lower than V2) can be applied to interface wordlines diup0 and diup1 (i.e., the interface wordlines closest to the drain end of the memory string) as represented by waveform 551. In other embodiments, the respective voltages can have some other relationship relative to one another. This particular arrangement of the respective positive voltages is configured to generate a graded electric field between the top deck 510, the middle deck 515, and the bottom deck 520 of the memory array due to the potential difference in the channel of the memory string created by the respective wordline voltages. The presence of a gently graded electric field along the channel can reduce or avoid hot electron generation and the accompanying damaging impacts. In one embodiment, all the interface dummy WL voltages are not positive, and depending on the WL voltages on the other WLs, they may be negative as well.

At operation 325, decks of the memory array are separated. For example, the control logic can electrically separate the top deck 410 from the bottom deck 420 at an end of the seeding phase 460 of the program operation. As shown in FIG. 4B, the separation phase 462 follows the seeding phase 460. In one embodiment, electrically separating the top deck 410 from the bottom deck 420 comprises causing a ground voltage (i.e., 0V) to be applied to at least a subset of the plurality of interface wordlines. In one embodiment, for example, the ground voltage is applied to interface wordlines dilow0 and dilow 1 during the separation phase 462, as represented by waveforms 442 and 444. In other embodiments, the ground voltage can be applied to some other subset of the interface wordlines. Applying a ground (or negative) voltage to one or more of the interface wordlines disconnects the continuous channel potential that exists in the top deck from the bottom deck. Without doing this, the entire string including the top and bottom decks are electrically connected together. By shutting off some cells at the interface, the top deck channel potential is disconnected from the bottom deck channel potential. In other embodiments, it can be some other subset of WLs that is shut off, besides dilow0 and dilow1. Additionally, depending on the threshold voltage of the cells associated with the interface wordlines, a negative voltage can be applied to shut off those cells instead of a ground voltage. In some cases, a low positive voltage may be enough to shut off those cells. The electrical separation between the two decks improves the boost efficiency during the inhibit/programming phase. Since the wordlines in the bottom deck have a higher voltage during the seeding phase, they are not capable to boost the pillar as high during the inhibit/programming phase, so they are excluded from the boosting of the top deck by causing a ground (or negative) voltage to be applied to a subset of the dummy wordlines at the interface. The ground voltage can be applied only to a subset to grade the field between the two decks. In addition, a preset operation (i.e., setting the threshold voltage of the memory cells at a level higher than 0V) can be performed on dilow0/dilow 1 (or some other subset) to improve the efficiency of the electrical separation. This reduces the need for negative voltages to shut off those cells by increasing the threshold voltage of those cells. Additionally, since the boost of the top and bottom decks are separated, there is no need to boost the bottom deck as high. This enables use of a lower Vpass voltage during the inhibit phase on the bottom deck, reducing the Vpass disturb on the bottom deck. This is useful in the block-by-deck operation as the top deck can be programmed/erased hundreds of times while retaining data on the bottom deck.

At operation 330, a program voltage is applied. For example, the control logic can cause a program voltage to be applied to the selected wordline of the memory array during an inhibit/programming phase 464 of the program operation. As shown in FIG. 4B, the program voltage can have a significantly higher magnitude (i.e., V8) during the inhibit/programming phase 464, as represented by waveform 450. The program voltage can cause the desired level of charge (i.e., representing host data) to be stored in the memory cells associated with the selected wordline. As shown in FIG. 5B, the program voltage can have a significantly higher magnitude (i.e., V8) during the inhibit/programming phase 564, as represented by waveform 550. The program voltage can cause the desired level of charge (i.e., representing host data) to be stored in the memory cells associated with the selected wordline.

At operation 335, respective voltages are applied to interface wordlines. For example, the control logic can cause respective positive voltages to be applied to at least a subset of the plurality of interface wordlines of the memory array during the inhibit/programming phase 464 of the program operation. As shown in FIG. 4B, the respective positive voltages applied to the interface wordlines during the inhibit/programming phase 464 are represented by waveforms 446 and 448. For example, a higher voltage (e.g., close to or between V3 and V4) can be applied to diup1, as represented by waveform 448, while the lower voltage V2 can be applied to diup0, as represented by waveform 446. The ground voltage is continued to be applied to dilow0 and dilow 1, as represented by waveforms 444 and 442. In other embodiments, the respective voltages can have some other relationship relative to one another. This particular arrangement of the respective positive voltages is configured to generate a graded electric field between the top deck 410 and the bottom deck 420 of the memory array due to the potential difference in the channel of the memory string created by the respective wordline voltages. The presence of a gently graded electric field along the channel is useful to reduce or avoid hot electron generation and accompanying damaging impacts.

At operation 340, pass voltages are applied to certain wordlines. For example, the control logic can cause a first pass voltage to be applied to the first plurality of wordlines (i.e., the wordlines in bottom deck 420) of the memory array during the inhibit/programming phase 464 of the program operation and can cause a second pass voltage to be applied to the second plurality of wordlines (i.e., the wordlines in the top deck 410) of the memory array during the inhibit/programming phase 464 of the program operation. As shown in FIG. 4B, the second pass voltage can have a greater magnitude (i.e., V7, as represented by the waveform 452) than the first pass voltage (i.e., V6, as represented by the waveform 440). In other embodiments, the respective pass voltages can have some other relationship relative to one another. As shown in FIG. 5B, the second pass voltage can have a greater magnitude (i.e., V7, as represented by the waveform 553) than the first pass voltage (i.e., V6, as represented by the waveform 540), and the waveform 552 has a magnitude between V4 and V5. In other embodiments, the respective pass voltages can have some other relationship relative to one another.

Figure 6:
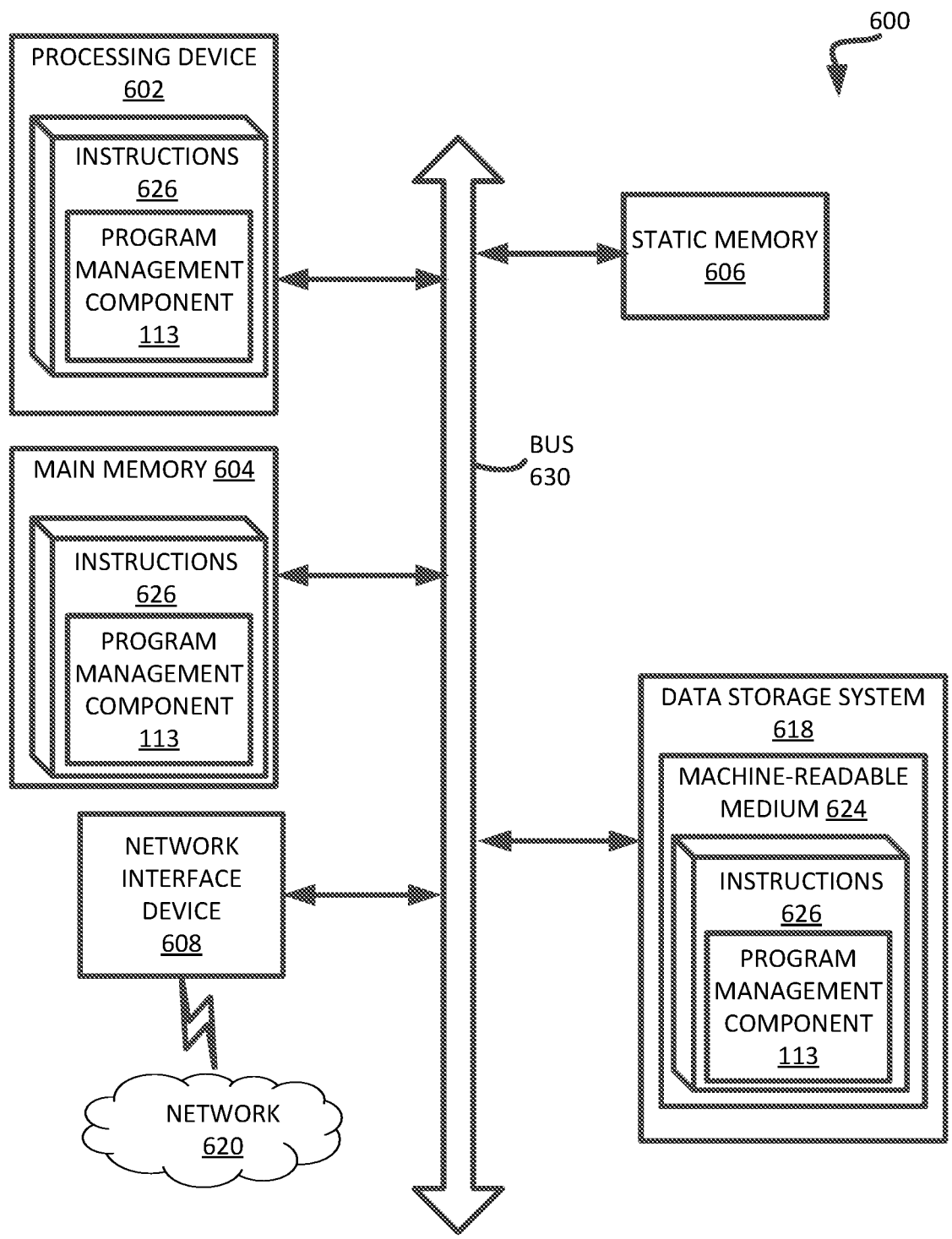
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the program management component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium, such as a non-transitory computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to the program management component 113 of FIG. 1A). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a memory array comprising a top deck and a bottom deck; and
   control logic, operatively coupled with the memory array, to perform operations comprising:
   initiating a program operation on the memory array;
   causing a first positive voltage to be applied to a first plurality of wordlines of the memory array during a seeding phase of the program operation, wherein the first plurality of wordlines is associated with memory cells in the bottom deck of the memory array that are in a programmed state;
   causing a ground voltage to be applied to a second plurality of wordlines of the memory array during the seeding phase of the program operation, wherein the second plurality of wordlines is associated with memory cells in the top deck of the memory array;
   electrically separating the top deck from the bottom deck at an end of the seeding phase of the program operation; and
   causing a program voltage to be applied to a selected wordline of the memory array during an inhibit phase of the program operation, wherein the selected wordline is associated with respective memory cells in the top deck of the memory array.

2. The memory device of claim 1, wherein a plurality of strings of memory cells extend from a drain adjacent to the top deck to a source adjacent to the bottom deck of the memory array, wherein the program operation proceeds wordline by wordline from the drain to the source within each of the top deck and the bottom deck.

3. The memory device of claim 1, wherein the control logic is to perform operations further comprising:
   causing respective positive voltages to be applied to a plurality of interface wordlines of the memory array during the seeding phase of the program operation, wherein the plurality of interface wordlines are positioned at a boundary between the top deck and the bottom deck of the memory array, the respective positive voltages to generate a graded electric field between the top deck and the bottom deck of the memory array.

4. The memory device of claim 3, wherein the first positive voltage applied to the first plurality of wordlines has a greater magnitude than the respective positive voltages applied to the plurality of interface wordlines.

5. The memory device of claim 3, wherein electrically separating the top deck from the bottom deck at the end of the seeding phase comprises causing at least one of a ground voltage or a negative voltage to be applied to at least a subset of the plurality of interface wordlines.

6. The memory device of claim 3, wherein the control logic to perform operations further comprising:
   causing respective positive voltages to be applied to at least a subset of the plurality of interface wordlines of the memory array during the inhibit phase of the program operation, the respective positive voltages to generate a graded electric field between the top deck and the bottom deck of the memory array.

7. The memory device of claim 1, wherein the control logic to perform operations further comprising:
   causing a first pass voltage to be applied to the first plurality of wordlines of the memory array during the inhibit phase of the program operation; and
   causing a second pass voltage to be applied to the second plurality of wordlines of the memory array during the inhibit phase of the program operation, wherein the second pass voltage has a greater magnitude than the first pass voltage.

8. A method comprising:
   initiating a program operation on a memory array of a memory device, the memory array comprising a top deck and bottom deck;
   causing a first positive voltage to be applied to a first plurality of wordlines of the memory array during a seeding phase of the program operation, wherein the first plurality of wordlines is associated with memory cells in the bottom deck of the memory array that are in a programmed state;
causing a ground voltage to be applied to a second plurality of wordlines of the memory array during the seeding phase of the program operation, wherein the second plurality of wordlines is associated with memory cells in the top deck of the memory array;
electrically separating the top deck from the bottom deck at an end of the seeding phase of the program operation; and
causing a program voltage to be applied to a selected wordline of the memory array during an inhibit phase of the program operation, wherein the selected wordline is associated with respective memory cells in the top deck of the memory array.

9. The method of claim 8, wherein a plurality of strings of memory cells extend from a drain adjacent to the top deck to a source adjacent to the bottom deck of the memory array, and wherein the program operation proceeds wordline by wordline from the drain to the source within each of the top deck and the bottom deck.

10. The method of claim 8, further comprising:
causing respective positive voltages to be applied to a plurality of interface wordlines of the memory array during the seeding phase of the program operation, wherein the plurality of interface wordlines are positioned at a boundary between the top deck and the bottom deck of the memory array, the respective positive voltages to generate a graded electric field between the top deck and the bottom deck of the memory array.

11. The method of claim 10, wherein the first positive voltage applied to the first plurality of wordlines has a greater magnitude than the respective positive voltages applied to the plurality of interface wordlines.

12. The method of claim 10, wherein electrically separating the top deck from the bottom deck at the end of the seeding phase comprises causing at least one of a ground voltage or a negative voltage to be applied to at least a subset of the plurality of interface wordlines.

13. The method of claim 10, further comprising:
causing respective positive voltages to be applied to at least a subset of the plurality of interface wordlines of the memory array during the inhibit phase of the program operation, the respective positive voltages to generate a graded electric field between the top deck and the bottom deck of the memory array.

14. The method of claim 8, further comprising:
causing a first pass voltage to be applied to the first plurality of wordlines of the memory array during the inhibit phase of the program operation; and
causing a second pass voltage to be applied to the second plurality of wordlines of the memory array during the inhibit phase of the program operation, wherein the second pass voltage has a greater magnitude than the first pass voltage.

15. A memory device comprising:
a bottom deck comprising a first plurality of wordlines;
a top deck comprising a second plurality of wordlines; and
a plurality of strings of memory cells spanning the top deck and the bottom deck of the memory device, wherein each string of the plurality of strings of memory cells comprises a first set of memory cells coupled to the first plurality of wordlines in the bottom deck of the memory device and a second set of memory cells coupled to the second plurality of wordlines in the top deck of the memory device, wherein the first set of memory cells is in a programmed state,
wherein the first plurality of wordlines is configured to receive a first positive voltage during a seeding phase of a program operation,
wherein the second plurality of wordlines is configured to receive a ground voltage during the seeding phase of the program operation, and
wherein a selected wordline of the top deck is configured to receive a program voltage during an inhibit phase of the program operation.

16. The memory device of claim 15, further comprising:
a plurality of interface wordlines positioned at a boundary between the top deck and the bottom deck of the memory device, wherein the plurality of interface wordlines are configured to receive respective positive voltages during the seeding phase of the program operation, the respective positive voltages to generate a graded electric field between the top deck and the bottom deck of the memory device.

17. The memory device of claim 16, wherein the first positive voltage received at the first plurality of wordlines has a greater magnitude than the respective positive voltages received at the plurality of interface wordlines.

18. The memory device of claim 16, wherein at least a subset of the plurality of interface wordlines is configured to receive at least one of a ground voltage or a negative voltage at an end of the seeding phase to electrically separate the top deck from the bottom deck of the memory device.

19. The memory device of claim 16, wherein at least a subset of the plurality of interface wordlines are configured to receive respective positive voltages during the inhibit phase of the program operation, the respective positive voltages to generate a graded electric field between the top deck and the bottom deck of the memory device.

20. The memory device of claim 15, wherein the first plurality of wordlines is configured to receive a first pass voltage during the inhibit phase of the program operation, and wherein the second plurality of wordlines is configured to receive a second pass voltage during the inhibit phase of the program operation, wherein the second pass voltage has a greater magnitude than the first pass voltage.

* * * * *